April 21, 1925.

Re. 16,044

L. G. CAMPBELL

CLOTHES DRIER

Original Filed April 22, 1924

2 Sheets-Sheet 1

INVENTOR:
Lewis G. Campbell
BY Allen & Allen
ATTORNEYS.

April 21, 1925. Re. 16,044

L. G. CAMPBELL

CLOTHES DRIER

Original Filed April 22, 1924 2 Sheets-Sheet 2

INVENTOR:
Lewis G. Campbell

BY Allen & Allen
ATTORNEYS.

Reissued Apr. 21, 1925. Re. 16,044

UNITED STATES PATENT OFFICE.

LEWIS G. CAMPBELL, OF CINCINNATI, OHIO, ASSIGNOR TO THE PURITAN CABINET DRYER COMPANY, OF CINCINNATI, OHIO, A CORPORATION OF OHIO.

CLOTHES DRIER.

Original No. 1,521,274, dated December 30, 1924, Serial No. 708,279, filed April 22, 1924. Application for reissue filed February 21, 1925. Serial No. 10,968.

*To all whom it may concern:*

Be it known that I, LEWIS G. CAMPBELL, a citizen of the United States, and a resident of Cincinnati, in the county of Hamilton and State of Ohio, have invented certain new and useful improvements in Clothes Driers, of which the following is a full, clear, and exact description, reference being had to the accompanying drawings, forming part of this specification.

My invention relates to cabinet receptacles for the drying of clothes in the laundry and is especially designed for houshold use to furnish a drying receptacle which shall occupy very little space, shall be most convenient to operate at very little expense, and while manufactured of sheet metal shall be provided with wooden racks to prevent contact of the clothes while wet and drying with any metal parts.

The invention consists of that certain novel construction and arrangement of parts to be hereinafter particularly pointed out and claimed, whereby the above results are attained.

Figure 1:
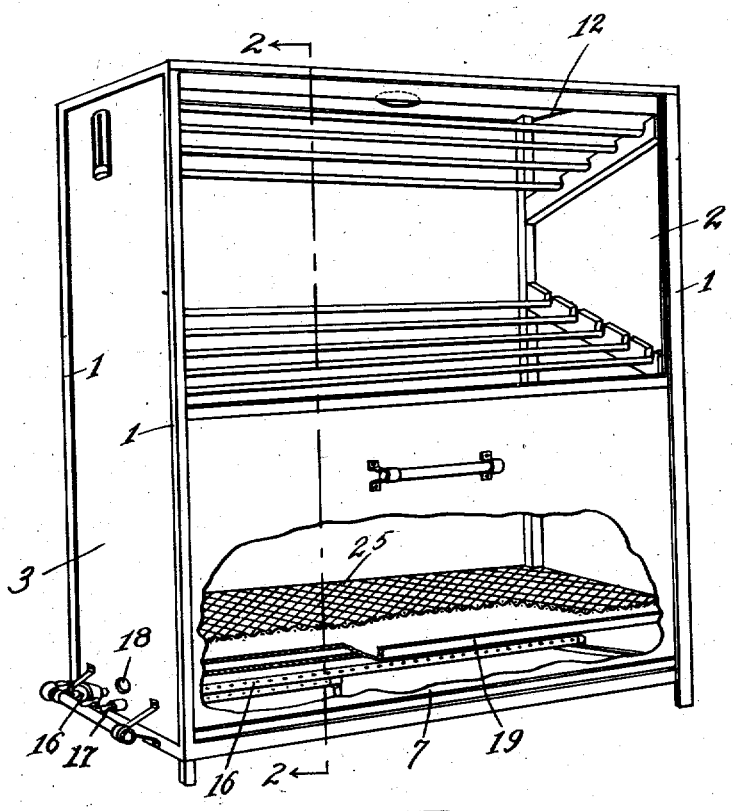
Figure 1 is a perspective view of the drier opened for the reception of the clothes and broken away in parts to show the inner construction.
Figure 2:
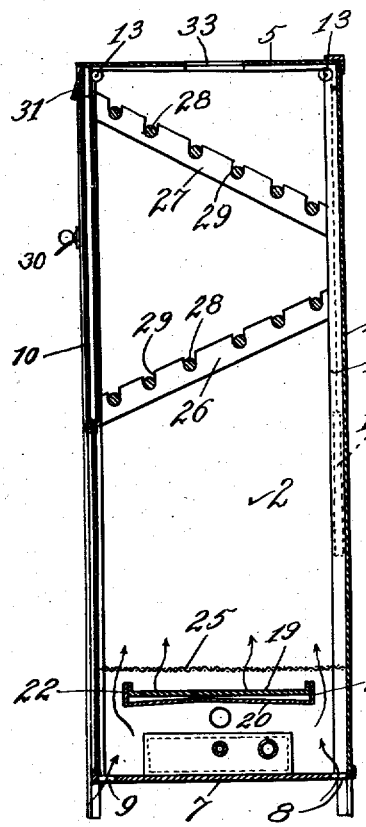
Figure 2 is a central vertical cross section on line 2—2 of Figure 1.
Figure 3:
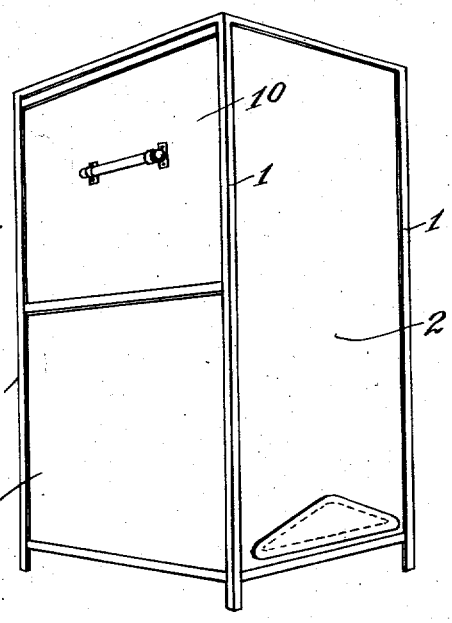
Figure 3 is a perspective view of the drier closed.

The cabinet is preferably rectangular in section formed of a framework of angle iron corner pieces 1 with galvanized sheet metal sides 2, 3, back 4 and top 5, secured to the corner supports by riveting or otherwise to form a tight enclosure. The lower half of the front wall 6 is also secured permanently in place.

The bottom plate 7 for the receptacle is also of sheet metal, but spaces 9 and 8 are left open preferably along the front and rear for the entrance of air.

The upper half of the front is closed by a sliding door 10 of sheet metal which extends entirely across the front to give full access to the interior of the cabinet when the door is open. The door is guided and slides in the front corner pieces and is suspended like a window by pulley cords 12, 12, which run over pulleys 13 at the corners and are attached to weights 14 to balance the weight of the door with the weight sliding in weight boxes 15 at the rear corners. With this construction the manipulation of the door takes no room space and gives full and complete access to the clothes racks upon which the clothes are hung without the necessity of pulling out the racks or opening of doors into the space of the room, so that the entire space required in the laundry is that taken by the cabinet itself when closed.

The interior of the cabinet is heated by a gas burner 16 which extends the full width of the cabinet and is mounted through one of the side walls at the bottom immediately over the bottom plate 7. A pilot burner 17 is also provided of short length alongside of the main burner 16 which pilot is arranged to be ignited on the outside and to carry the flame inside to ignite the burner 16, and a sight opening 18 is provided in the end wall above the burner to permit view of the flame.

The burner openings do not extend to the end of the burner pipe, but are located a sufficient distance from the end walls so as not to excessively heat the end walls of the drier.

Located over the burner 16 and extending from end wall to end wall is a plate 19, but of considerably less width than the bottom, so as to leave a comparatively wide radiating space both for the front and rear, and between this plate 19 and the burner flame is a baffle plate 20, which at the front and rear is united to the plate 19, and which is closed at the ends by the end walls of the cabinet, so as to leave a dead air space between the baffle plate 20 and the plate 19. The baffle plate is dished upwardly down the center, so as to contain the burner flame and permit full radiation of heat at the front and rear of the plate 19. Located over the plate 19 is a wire mesh screen 25, which extends over the entire space of the cabinet to prevent clothes or dirt dropping down into the burner compartment.

For the suspension of the clothes, I provide wooden racks comprising notched side supports 26, 27, secured preferably diagonally from front to rear upon which are mounted wooden rods 28, which are rested at the ends in the notches 29 so that they can be removed or replaced if any rod is broken. The diagonal arrangement gives free, convenient access for the hanging and removal of the clothes, and as these racks are of wood, there is no danger of staining or soiling the clothes by contact with any metal.

To fill the cabinet the user pulls down the sliding door by the handle 30, giving complete access to the interior. Along the top of the cabinet across the front is a spring flange 31 so that when closed, a tight closure is obtained, the top edge of the door coming in contact with the overlapping flange.

The opening 33 for the flue pipe is placed in the middle of the top and the heat rises up through the clothes on the racks, equally at front and rear and passes out through the middle of the compartment, thus giving a very effective circulation and permitting the cabinet being located in any convenient place.

Having thus described my invention, what I claim as new and desire to secure by Letters Patent, is:—

1. In a clothes drier, the combination with a closed metallic casing with the upper portion of the front open across its entire extent, and a metallic door to close said opening, adapted to slide parallel with the front wall to open the casing for free access to the upper portion thereof, a gas burner in the bottom of the casing, with a wooden rack relatively fixed in the upper portion of the casing for the support of the clothes to be dried.

2. In a clothes drier, the combination with a closed metallic casing with the upper portion of the front open across its entire extent and a metallic door to close said opening, adapted to slide parallel with the front wall to open the casing for free access to the upper portion thereof, a gas burner in the bottom of the casing, with a wooden rack relatively fixed in the upper portion of the casing for the support of the clothes to be dried, said rack comprising wooden end supports secured to the casing, and a series of removable wooden rods supported by said end supports.

3. In a clothes drier, the combination with a closed metallic casing with the upper portion of the front open across its entire extent and a metallic door to close said opening, adapted to slide parallel with the front wall to open the casing for free access to the upper portion thereof, a gas burner in the bottom of the casing, with a wooden rack relatively fixed in the upper portion of the casing for the support of the clothes to be dried, said rack comprising a pair of wooden end supports secured to the casing at each side and arranged diagonally from front to rear and a series of removable wooden rods supported by and extending between said end supports.

4. In a clothes drier, a casing with a burner to heat the same on the inside, extending the width of the casing, and a cover plate mounted above the burner to divide the chamber into a heating and a drying compartment, the cover plate extending from end wall to end wall of the casing, with free openings along the sides of the cover plate at front and rear of the cover plate for the passage of heat from the heating to the drying compartment.

5. In a clothes drier, a casing with a burner to heat the same on the inside, extending the width of the casing, and a cover plate mounted above the burner to divide the chamber into a heating and a drying compartment, the cover plate extending from end wall to end wall of the casing, with free openings along the sides of the cover plate at front and rear of the cover plate for the passage of heat from the heating to the drying compartment, and a baffle plate below the cover plate and fitted to same to form a dead-air space above the burner.

6. In a clothes drier, the combination with a closed metallic casing with the upper portion of the front open substantially across its entire extent, and a metallic door to close said opening adapted to slide parallel with the front wall to open the casing for free access to the upper portion thereof, a heater in the bottom of the casing, with means for supporting the clothes to be dried in the upper portion of the casing.

7. In a clothes drier, the combination with a closed metallic casing with the upper portion of the front open substantially across its entire extent, and a metallic door to close said opening adapted to slide parallel with the front wall to open the casing for free access to the upper portion thereof, a heater in the bottom of the casing, with a rack in the upper portion of the casing for the support of the clothes to be dried.

8. In a clothes drier, the combination with a closed metallic casing with the upper portion of the front open substantially across its entire extent, and a metallic door to close said opening adapted to slide parallel with the front wall to open the casing for free access to the upper portion thereof, a heater in the bottom of the casing, with a rack relatively fixed in the upper portion of the casing for the support of the clothes to be dried.

LEWIS G. CAMPBELL.